US012592409B2

(12) United States Patent
Xi et al.

(10) Patent No.: US 12,592,409 B2
(45) Date of Patent: Mar. 31, 2026

(54) APPARATUS FOR A PRISMATIC BATTERY CELL WITH BUILT-IN SPRINGS

(71) Applicant: GM GLOBAL TECHNOLOGY OPERATIONS LLC, Detroit, MI (US)

(72) Inventors: Liang Xi, Northville, MI (US); Binsong Li, Troy, MI (US); Srilakshmi Katar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 588 days.

(21) Appl. No.: 17/950,498

(22) Filed: Sep. 22, 2022

(65) Prior Publication Data

US 2024/0105982 A1      Mar. 28, 2024

(51) Int. Cl.
 *H01M 10/04* (2006.01)
 *H01M 4/02* (2006.01)
 *H01M 4/134* (2010.01)

(52) U.S. Cl.
 CPC .. *H01M 10/0468* (2013.01); *H01M 2004/027* (2013.01); *H01M 4/134* (2013.01); *H01M 2220/20* (2013.01)

(58) Field of Classification Search
 CPC .................... H01M 2004/027; H01M 2220/20
 USPC ........................................ 429/66
 See application file for complete search history.

(56) References Cited

U.S. PATENT DOCUMENTS

| | | | |
|---|---|---|---|
| 6,413,672 B1 * | 7/2002 | Suzuki | H01M 4/621 429/231.95 |
| 2004/0175609 A1 * | 9/2004 | Yageta | H01M 50/186 429/185 |
| 2012/0105001 A1 * | 5/2012 | Gallegos | B60L 53/66 320/109 |
| 2019/0198911 A1 * | 6/2019 | Kim | H01M 10/052 |

FOREIGN PATENT DOCUMENTS

DE      102014206813 A1      10/2015

OTHER PUBLICATIONS

Jiao, "Behavior of Lithium Metal Anodes under Various Capacity Utilization and High Current Density in Lithium Metal Batteries", Joule, 2018.*

* cited by examiner

*Primary Examiner* — Matthew T Martin
(74) *Attorney, Agent, or Firm* — Quinn IP Law

(57) ABSTRACT

An apparatus for prismatic battery cell is provided. The apparatus includes a hard outer case defining an internal volume. The apparatus further includes an electrode stack disposed within the internal volume and includes a pair of an anode electrode and a cathode electrode. The electrode stack further includes a plurality of electrode pair layers stacked parallel to each other. The electrode pair layers each include a planar surface. The apparatus further includes a built-in spring configured for pressing against the electrode stack in a direction perpendicular to the planar surface of each of the electrode pair layers.

20 Claims, 7 Drawing Sheets

APPARATUS FOR A PRISMATIC BATTERY CELL WITH BUILT-IN SPRINGS

INTRODUCTION

The disclosure generally relates to an apparatus for a prismatic battery cell with built-in springs.

A battery includes at least one pair of an anode electrode and a cathode electrode and a separator disposed between the anode electrode and the cathode electrode. Each of the anode electrode and the cathode electrode includes or is formed upon a current collector which may be a conductive metal piece utilized to conduct electrical energy from the respective electrode to a battery terminal. The anode electrode is connected to a negative battery terminal, and the cathode electrode is connected to a positive battery terminal. A battery may include a can or an outer rigid housing useful to contain and protect the electrodes and separator. The can may be constructed of a metal.

An electrode stack may include one or more electrode pairs. According to one embodiment, the electrode stack may include a plurality of alternating flat electrodes. According to another embodiment, the electrode stack described as a jellyroll electrode stack may include a single flexible pair of electrodes, with the electrodes rolled into a cylindrical or a flattened cylindrical shape. A jellyroll electrode stack includes a separator layer, a cathode layer, an inert laminate layer, and an anode layer. Viewing an end of the jellyroll electrode stack, the layers may appear as a swirl, with the anode layer and the cathode layer separated by the separator layer. The anode layer may be connected to a negative battery terminal through a first current collector, and the cathode layer may be connected to a positive battery terminal through a second current collector.

SUMMARY

An apparatus for prismatic battery cell is provided. The apparatus includes a hard outer case defining an internal volume. The apparatus further includes an electrode stack disposed within the internal volume and includes a pair of an anode electrode and a cathode electrode. The electrode stack further includes a plurality of electrode pair layers stacked parallel to each other. The electrode pair layers each include a planar surface. The apparatus further includes a built-in spring configured for pressing against the electrode stack in a direction perpendicular to the planar surface of each of the electrode pair layers.

In some embodiments, the apparatus further includes a hard plastic supporting plate disposed between the built-in spring and the electrode stack. The hard plastic supporting plate is configured for evenly distributing force upon the electrode stack.

In some embodiments, the hard plastic supporting plate is affixed to the built-in spring and is configured for maintaining a location and an orientation of the built-in spring within the prismatic battery cell.

In some embodiments, the apparatus further includes a plurality of built-in springs configured for pressing against the electrode stack.

In some embodiments, the electrode stack includes a jellyroll electrode, wherein the pair of the anode electrode and the cathode electrode include a flexible electrode and a flexible cathode electrode and wherein the anode electrode and the cathode electrode are disposed in a rolled shape.

In some embodiments, the electrode stack includes a stack of flat pairs of the anode electrodes and the cathode electrodes.

In some embodiments, the anode electrode is a high-expansion anode electrode. A ratio of a maximum volume of the anode electrode in a fully lithiated state to a minimum volume of the anode electrode in a fully delithiated state is at least 1.5 to 1.

In some embodiments, the anode electrode includes lithium metal.

In some embodiments, the anode electrode is a high-silicon content anode electrode. Silicon is present in the anode electrode in a range from 5 parts by weight to 100 parts by weight per 100 parts by weight of the anode electrode.

In some embodiments, the built-in spring is configured for maintaining at least a minimum electrode pressure upon the electrode stack when the anode electrode is in a fully delithiated state.

In some embodiments, the built-in spring is configured for not exceeding a maximum electrode pressure upon the electrode stack when the anode electrode is in a fully lithiated state.

In some embodiments, the hard outer case is a rectangular polyhedron including a relatively long edge and a relatively short edge which is shorter than the relatively long edge.

In some embodiments, the planar surface of each of the electrode pair layers is perpendicular to the relatively short edge.

In some embodiments, the planar surface of each of the electrode pair layers is perpendicular to the relatively long edge.

In some embodiments, the hard outer case is a rectangular polyhedron having a first side and a second side. The apparatus further includes a first tab including a first battery terminal disposed on the first side and a second tab including a second battery terminal disposed on the second side.

In some embodiments, the built-in spring is disposed between the electrode stack and the hard outer case.

In some embodiments, the electrode stack is a first electrode stack. The apparatus further includes a second electrode stack disposed within the internal volume. The built-in spring is disposed between the first electrode stack and the second electrode stack and is configured for pressing against the first electrode stack and the second electrode stack.

In some embodiments, the built-in spring is a first built-in spring. The apparatus further includes a third electrode stack and a second built-in spring disposed between the second electrode stack and the third electrode stack. The second built-in spring is configured for pressing against the second electrode stack and the third electrode stack.

According to one alternative embodiment, a system is provided. The system includes a device including a prismatic battery cell. The prismatic battery cell includes a hard outer case defining an internal volume. The prismatic battery cell further includes an electrode stack disposed within the internal volume and including a pair of an anode electrode and a cathode electrode. The electrode stack further includes a plurality of electrode pair layers stacked parallel to each other. The electrode pair layers each include a planar surface. The prismatic battery cell further includes a plurality of built-in springs configured for pressing against the electrode stack in a direction perpendicular to the planar surface of each of the electrode pair layers.

In some embodiments, the device is a vehicle.

The above features and advantages and other features and advantages of the present disclosure are readily apparent from the following detailed description of the best modes for carrying out the disclosure when taken in connection with the accompanying drawings.

DETAILED DESCRIPTION

Figures 1, 2:
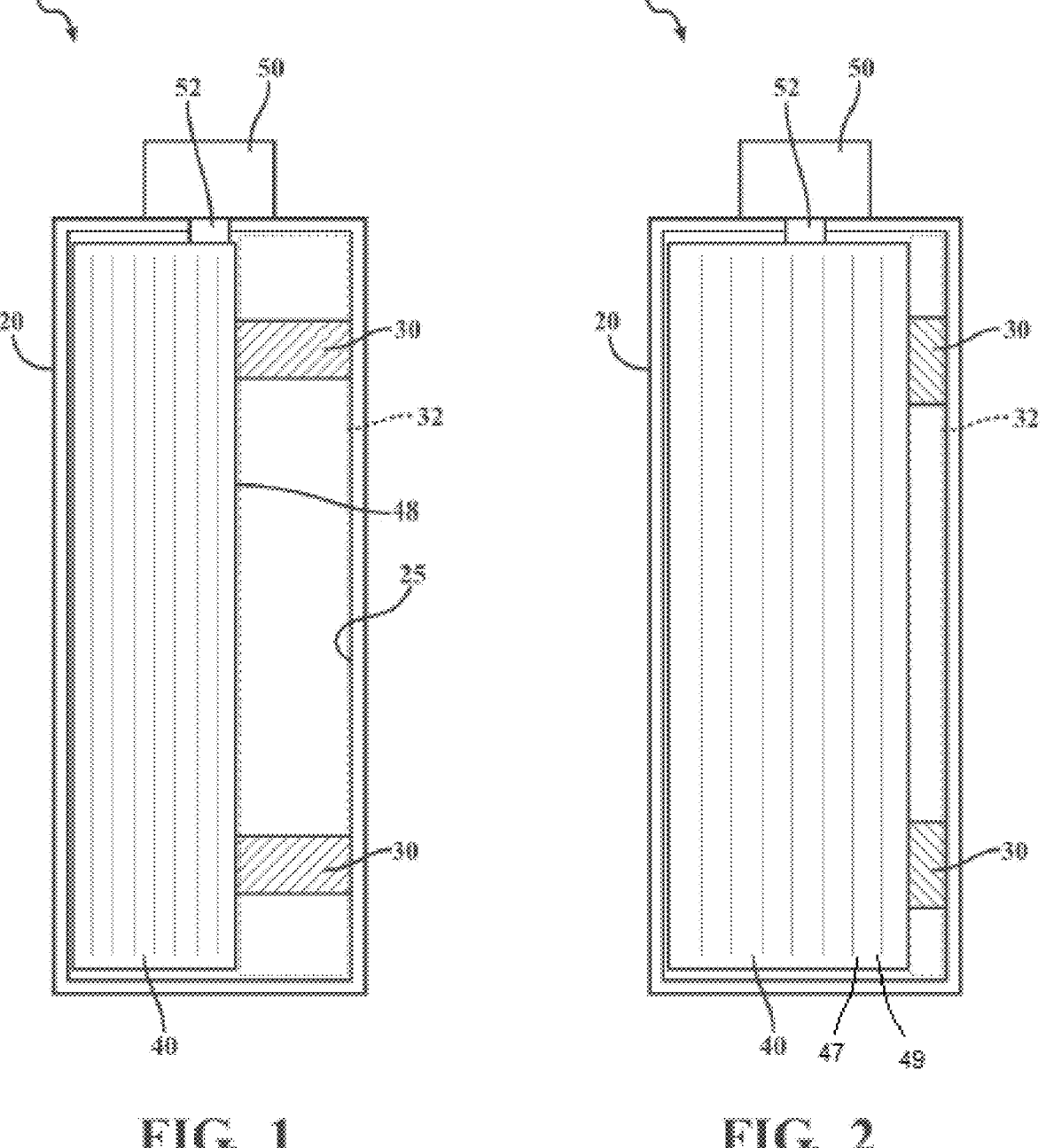
FIG. 1 schematically illustrates in side cross-sectional view an exemplary prismatic battery cell including an electrode stack and at least one built-in spring pressing upon the electrode stack, wherein a volume of the electrode stack is at a minimum electrode stack volume, in accordance with the present disclosure.
FIG. 2 schematically illustrates in side cross-sectional view the prismatic battery cell of FIG. 1, wherein the volume of the electrode stack is at a maximum electrode stack volume, in accordance with the present disclosure.

Some battery cells may include anode electrodes that may be described as high-expansion anode electrodes. A lithiation and delithiation process may be described as occurring on an anode electrode during cyclical charging and discharging cycles. As a result of the lithiation and delithiation process in the battery cell, the anode electrode volume may change from a maximum volume to a minimum volume. The anode electrode volume change from the minimum volume to the maximum volume may be described as an anode electrode expansion ratio. In one embodiment, a high-expansion anode electrode may be described as having an anode electrode expansion ratio of at least 1.5 to 1.

In another embodiment, an anode electrode within an electrode stack of a prismatic battery cell may cause unacceptable expansion of the electrode stack when a hard case deformation limit is exceeded. In one example, an anodeless lithium battery during lithiation may create or cause a total thickness of the electrode stack exceeding a hard case deformation limit due to large electrode expansion. Such large electrode expansion may occur either at the end of lithiation due to reversible volume expansion or at the end of cell cycle life due to the combination of reversible and irreversible volume expansion.

Pressure within a prismatic battery cell affects battery cell performance and lifespan. If an electrode is subject to too much pressure, an electrode film may crack and cause the increased cell resistance or lithium dendrite growth. Additionally, high pressure during cell charging may cause a hard outer case of the prismatic battery cell to become deformed or damaged. If an electrode is subject to too low pressure, a contact between electrode layers or contact between particles in an electrode film may be poor, which may increase cell resistance and decrease the cell performance. A minimum desired electrode pressure and a maximum desired electrode pressure or a desired electrode pressure range may be defined for an anode electrode.

If a high-expansion anode electrode is disposed within a prismatic battery cell with a rigid outer housing, during the large changes in volume that occur during cyclical charging and discharging cycles, the anode electrode is likely to experience either high pressure conditions when the volume of the anode electrode increases and the electrode presses outwardly against the rigid outer housing or low pressure conditions when the volume of the anode electrode decreases and the pressure within the battery cell drops.

An apparatus including a prismatic battery cell including internal or built-in springs to enable use of high-expansion anode electrodes is provided. The disclosed prismatic battery cells with build-in springs as pressure control enable the usage of high-expansion anodes in order to achieve high energy density prismatic battery cells. The built-in springs within the prismatic battery cell enable the anode electrode to expand and shrink within the hard outer case of the prismatic battery cell while staying within a desired electrode pressure range. The built-in springs provide a buffer, maintaining at least a minimum desired electrode pressure within the prismatic battery cell during delithiation and maintaining an electrode pressure below a maximum desired electrode pressure during lithiation.

A spring geometry, a spring factor, and a number of springs utilized within the prismatic battery cell may be controlled according to a geometry of the hard outer case of the prismatic battery cell, a geometry of the electrode stack, a desired electrode pressure range, and an anode electrode expansion ratio.

The disclosed apparatus includes a novel prismatic battery cell design that uses built-in springs inside the cell case to mitigate an overpressure issue resulted from high-expansion anode electrodes. Exemplary high-expansion anode electrodes may be constructed with lithium metal or may be high-silicon content anode electrodes. Within a high-silicon content anode electrode, silicon may be present in the anode electrode in a range from 5 parts by weight to 100 parts by weight per 100 parts by weight of the anode electrode. The prismatic battery cell enables usage of such anode materials with high capacity and exhibiting a high-expansion rate in order to achieve a high energy density prismatic battery cell.

The internal or built-in springs absorb the large expansion of the electrode stack during cell charging while maintaining the desired electrode pressure range. The disclosed built-in springs may be used on prismatic battery cells with lithium-ion cell chemistries with either a liquid electrolyte or solid-state cell chemistries. The disclosed built-in springs also can be used with a wound jellyroll electrode stack, stacked flat electrodes, or with other electrode geometries.

The disclosed prismatic battery cell may be described as a standalone prismatic battery cell, as opposed to prismatic battery cells that may include spring mechanisms or features located externally to the prismatic battery cell.

A prismatic battery cell may include a single electrode stack and a set of built-in springs enabling the single electrode stack to move within the hard outer case of the prismatic battery cell as the electrode stack expands and shrinks. In another embodiment, a plurality of electrode stacks with a set of built-in springs between each of the electrode stacks may reduce an overall relative movement of the electrode stacks relative to the hard outer case, thereby reducing wear upon the electrodes and providing excellent battery cell lifespan.

Referring now to the drawings, wherein like reference numbers refer to like features throughout the several views, FIG. 1 schematically illustrates in side cross-sectional view an exemplary prismatic battery cell 10 including a hard outer case 20, an electrode stack 40, and at least one built-in spring 30 pressing upon the electrode stack 40, wherein a volume of the electrode stack 40 is at a minimum electrode stack volume. FIG. 2 schematically illustrates in side cross-sectional view the prismatic battery cell 10 of FIG. 1, wherein the volume of the electrode stack 40 is at a maximum electrode stack volume.

Referring to FIGS. 1 and 2, the illustrated built-in springs 30 pressing upon the electrode stack 40 are configured for creating an electrode pressure within the electrode stack 40. The built-in spring 30 is illustrated disposed between the hard outer case 20 and the electrode stack 40. A plurality of the built-in springs 30 are illustrated and may be described collectively as a spring set. The built-in springs 30 press upon a side surface 48 of the electrode stack 40. The prismatic battery cell 10 further includes a tab 50 which may be described as a battery terminal and a current collector 52 connecting the tab 50 to the electrode stack 40. The current collector 52 may be a conductive piece of material in electrically conductive contact with the tab 50 and with active materials of a first of an anode electrode 47 and a cathode electrode 49 of the electrode stack 40. Another current collector is in contact with the second of the anode electrode 47 and the cathode electrode 49 of the electrode stack 40. The hard outer case 20 defines an internal volume 25.

The electrode stack 40 includes one or more pairs of anode electrode 47 and cathode electrode 49. The anode electrode 47 and the cathode electrode 49 include a separator disposed there between. Exemplary relative locations of the anode electrode 47 and the cathode electrode 49 are provided, although actual locations of the anode electrodes 47 and the cathode electrodes 49 within the electrode stack 40 will vary based upon the particular design and type of electrode stack 40. The electrode stack 40 may operate including lithium-ion chemistry and may further include a liquid electrolyte or may include a solid-state electrolyte.

When the prismatic battery cell 10 is in a fully discharged condition, the anode electrode(s) 47 of the electrode stack 40 may be described as being in a fully delithiated state, at which the electrode stack 40 has a minimum volume. When the prismatic battery cell 10 is in a fully charged condition, the anode electrode(s) 47 of the electrode stack 40 may be described as being in a fully lithiated state, at which the electrode stack 40 has a maximum volume.

The anode electrode 47 and the cathode electrode 49 of the electrode stack 40 are configured to operate in a desired electrode pressure range. The anode electrode 47 or anode electrodes 47 of the electrode stack 40 may be described as high-expansion electrodes. The volume of the electrode stack 40 changes based upon lithiation of the anode electrode 47 or anode electrodes 47 of the electrode stack 40. As the prismatic battery cell 10 is charged, the volume of the electrode stack 40 increases and fills an increasing percentage of the internal volume 25 of the hard outer case 20. If the electrode stack 40 in a delithiated state nearly filled the internal volume 25 of the hard outer case 20, as the volume of the electrode stack 40 increased during a battery cell charging event to match the internal volume 25 of the hard outer case 20 and the lithiation process of the anode electrode(s) 47 continued, a pressure within the hard outer case 20 acting upon the electrode stack 40 would sharply increase. Such a high-pressure condition may create an electrode pressure above the desired electrode pressure range for the anode electrode(s) 47 and cathode electrode(s) 49 of the electrode stack 40.

By utilizing the built-in springs 30 to press upon the electrode stack 40, a minimum electrode pressure of the desire electrode pressure range may be maintained when the electrode stack 40 is at its smallest volume or when the anode electrode(s) 47 of the electrode stack 40 are fully delithiated. As the volume of the electrode stack 40 increases during lithiation, the electrode stack 40 increases in volume and presses against the built-in springs 30, compressing the built-in springs 30. As the built-in springs 30 are compressed, they exert more force upon the electrode stack 40. One may determine a maximum volume of the electrode stack 40 when fully lithiated and may design or select the built-in springs 30 based upon maximum spring compression when the electrode stack 40 is at its maximum volume. With the built-in springs 30 at their maximum spring compression, the force that the built-in springs 30 exert upon the electrode stack 40 are less than the maximum electrode pressure of the desired electrode pressure range. Additionally, a maximum spring compression may be selected based upon a maximum force or deformation the hard outer case 20 is configured to withstand.

The built-in springs 30 may be utilized to prevent the electrode stack 40 from reaching a state of restricted volume within the internal volume 25 of the hard outer case 20 while further lithiation is taking place. In the embodiment of FIGS. 1 and 2, the built-in springs 30 may act upon a rigid or stable, flat, side surface 48 of the electrode stack 40. The built-in springs 30 may be isolated structures within the hard outer case 20. A spring volume 32 may be described as a volume within the hard outer case 20 which the built-in springs 30 prevent the electrode stack 40 from expanding into. The maximum volume of the electrode stack 40 plus the volume of the spring volume 32 when the built-in springs 30 fully compressed may be less than or equal to the internal volume 25 of the hard outer case 20, such that further lithiation does not take place once the volume of the electrode stack 40 plus the volume of the spring volume 32 match the internal volume 25 of the hard outer case 20.

The electrode stack 40 may include a plurality of flat pairs of anode electrodes 47 and cathode electrodes 49. The electrode stack 40 may alternatively include a jellyroll electrode stack including a flexible anode electrode 47 and a flexible cathode electrode 49 with a separator disposed therebetween disposed in a rolled shape.

Figure 3:
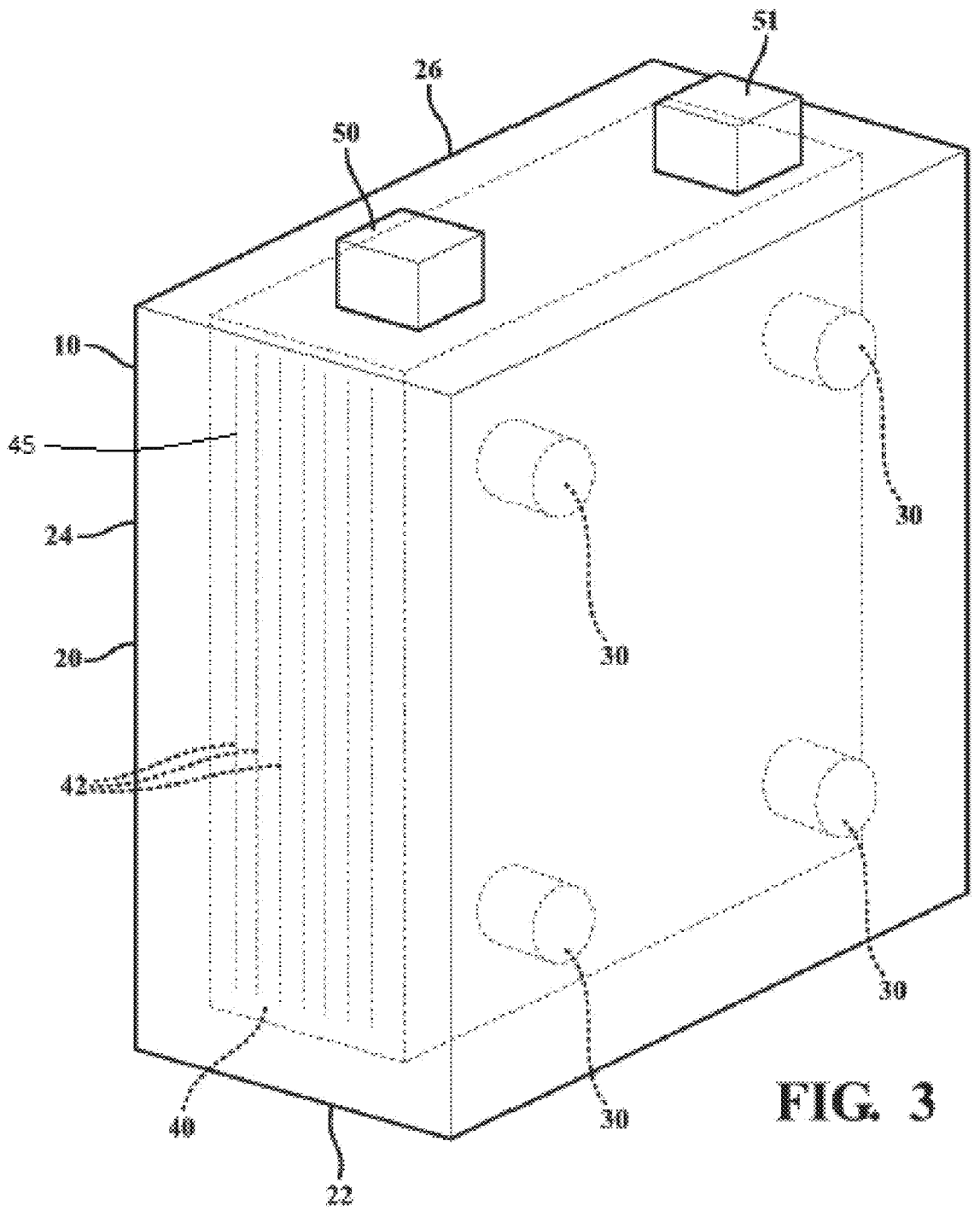
FIG. 3 schematically illustrates in perspective view the prismatic battery cell of FIG. 1, in accordance with the present disclosure.

FIG. 3 schematically illustrates in perspective view the prismatic battery cell 10 of FIG. 1. The prismatic battery cell 10 is illustrated including the hard outer case 20, the tab 50 which is a first tab, and an optional second tab 51. In some embodiments, the hard outer case 20 may be metallic and may act as a second battery terminal. The electrode stack 40 and the built-in springs 30 are illustrated with dashed lines, illustrating the electrode stack 40 and the built-in springs 30 as components of the prismatic battery cell 10 internal to the hard outer case 20. The hard outer case 20 is a rectangular polyhedron and includes a relatively short side edge 22 and a relatively long side edges 24, 26. The electrode stack 40 is illustrated with a plurality of electrode pair layers 42 arranged such that planar surfaces 45 of the electrode pair layers 42 are perpendicular to the short edge 22. When the electrode stack 40 is lithiated, the electrode stack 40 expands primarily in a direction perpendicular to the planar surfaces 45 of the electrode pair layers 42. The built-in springs 30 are disposed and oriented to displace or compress in the direction of the primary expansion of the electrode stack 40.

Figures 4, 5:
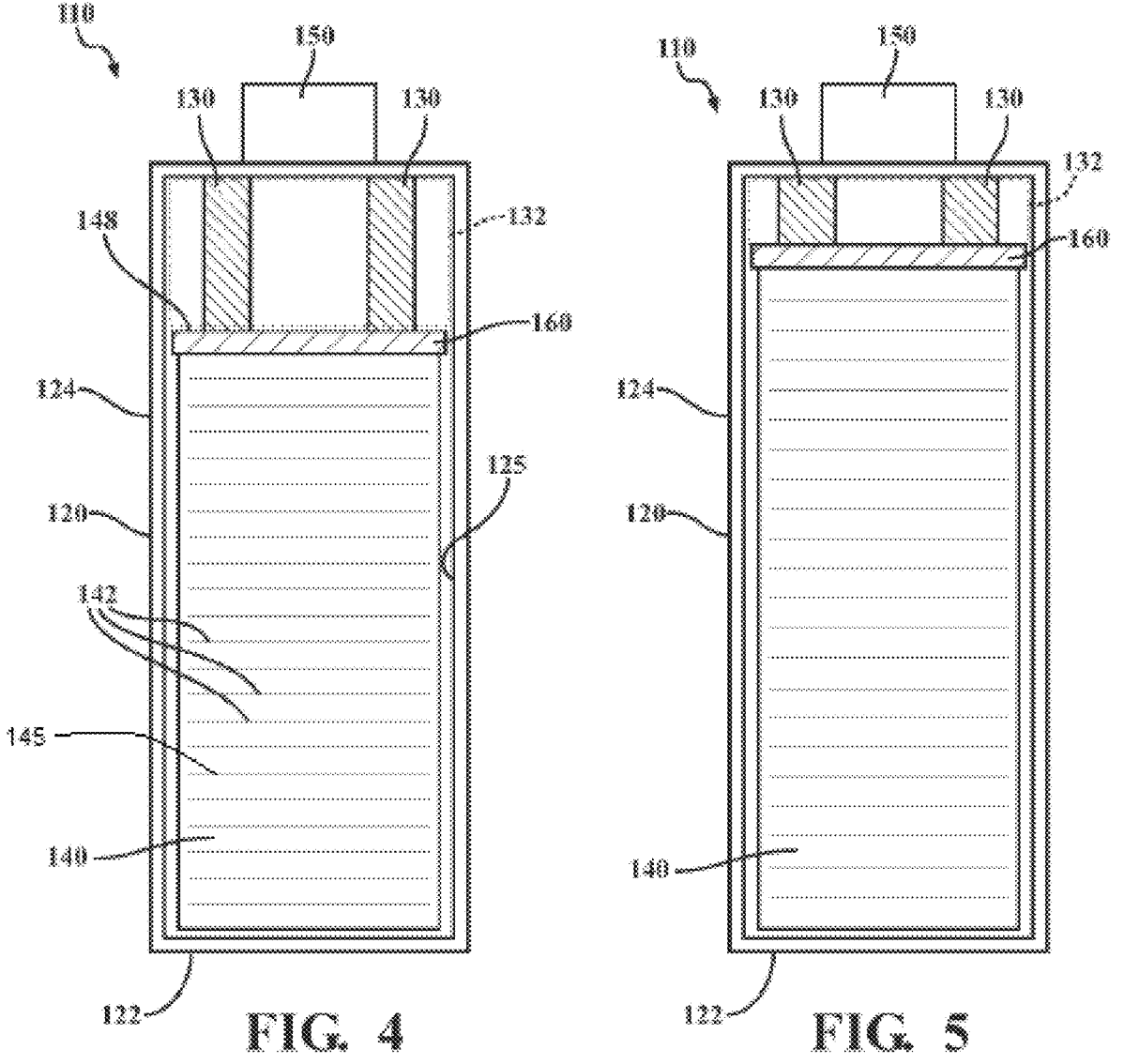
FIG. 4 schematically illustrates in side cross-sectional view an alternative embodiment of a prismatic battery cell, wherein an electrode stack is at a minimum electrode volume, in accordance with the present disclosure.
FIG. 5 schematically illustrates in side cross-sectional view the prismatic battery cell of FIG. 4, wherein the electrode stack is at a maximum electrode volume, in accordance with the present disclosure.

FIG. 4 schematically illustrates in side cross-sectional view an alternative embodiment of a prismatic battery cell 110, wherein an electrode stack 140 is at a minimum electrode volume. FIG. 5 schematically illustrates in side cross-sectional view the prismatic battery cell 110, wherein the electrode stack 140 is at a maximum electrode volume.

Referring to FIGS. 4 and 5, the prismatic battery cell 110 operates similarly to the prismatic battery cell 10 of FIGS. 1 and 2, with an exception that planar surfaces 145 of electrode pair layers 142 of the electrode stack 140 are oriented in a different direction. The prismatic battery cell 110 is illustrated including a hard outer case 120, built-in springs 130 pressing against the electrode stack 140, and tab 150. The hard case 120 defines an internal volume 125. A current collector or a current collector connected to a conductive pathway connects the tab 150 to the electrode stack 140. A second tab may be present upon the prismatic battery cell 110. The hard outer case 120 is a rectangular polyhedron and includes a relatively short edge 122 and a relatively long edge 124.

A plate 160 is illustrated between the electrode stack 140 and the built-in springs 130. In one embodiment, the plate 160 may be described as a hard plastic supporting plate. The built-in springs 130 press upon and may be attached or affixed to a side surface 148 of the plate 160. The plate 160 may be optional and provides for even distribution of force over a face of the electrode stack 140. The plate 160 may be utilized with different types of electrode stack 140. The plate 160 may be at least as large as the exposed face of the jellyroll electrode or the stack of flat electrodes facing the plate 160 to cover the entire exposed face of the electrode stack 140 and avoid uneven compression of the electrode stack 140. The plate 160 may further fix a location and orientation of the built-in springs 130 within the prismatic battery cell 110. In some embodiments, the electrode stack 140 may include a rigid wall which may make the plate 160 unnecessary. The prismatic battery cell 10 of FIG. 1 may optionally include a similar plate between the built-in springs 30 and the electrode stack 40. In one embodiment, a thickness of the support may be between 1.5 millimeters and 3 millimeters.

The planar surfaces 145 of the electrode pair layers 142 are oriented to be perpendicular to the relatively long edge 124. When the electrode stack 140 is lithiated, the electrode stack 140 expands primarily in a direction perpendicular to the planar surfaces 145 of the electrode pair layers 142. The built-in springs 130 are disposed and oriented to displace or compress in the direction of the primary expansion of the electrode stack 140. The built-in springs 130 may, in some embodiments, act upon a rigid or stable, flat, side surface of the electrode stack 140. In the embodiment of FIG. 4, the built-in springs 130 act upon the side surface 148 of the plate 160. A spring volume 132 may be described as a volume within the hard outer case 120 in which the built-in springs 130 prevent the electrode stack 140 from expanding into.

Figure 6:
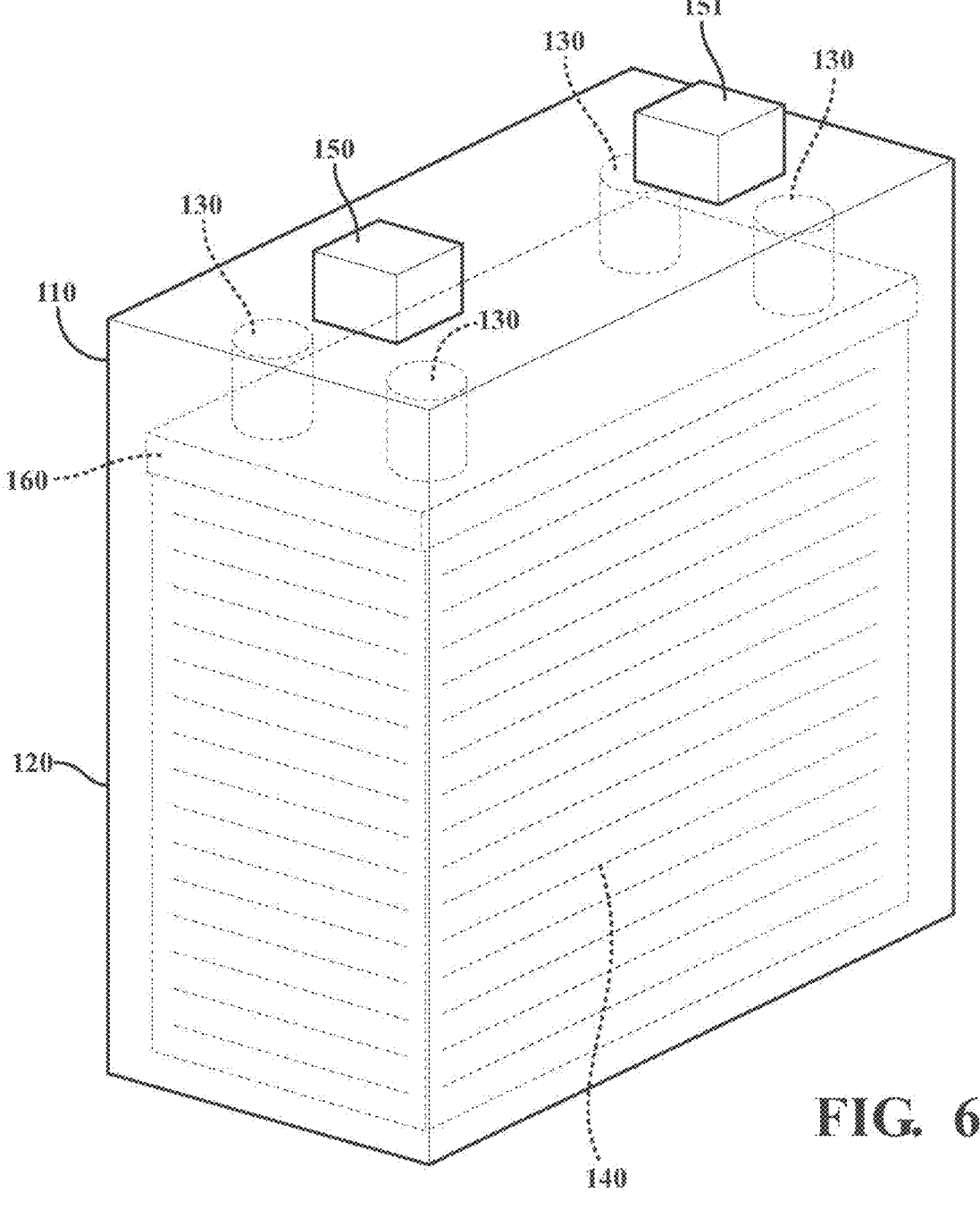
FIG. 6 schematically illustrates in perspective view the prismatic battery cell of FIG. 4, in accordance with the present disclosure.

FIG. 6 schematically illustrates in perspective view the prismatic battery cell 110 of FIG. 4. The prismatic battery cell 110 is illustrated including the hard outer case 120, the tab 150 which is a first tab, and an optional second tab 151. The plate 160 is illustrated disposed between the electrode stack 140 and the built-in springs 130. In some embodiments, the hard outer case 120 may be metallic and may act as a second battery terminal. The electrode stack 140, the plate 160, and the built-in springs 130 are illustrated with dashed lines, illustrating the electrode stack 140, the plate 160, and the built-in springs 130 as components of the prismatic battery cell 110 internal to the hard outer case 120.

Comparing the prismatic battery cell 10 of FIGS. 1-3 to the prismatic battery cell 110 of FIGS. 4-6, assuming the internal volume 25 of the hard outer case 20 to be equal to the internal volume 125 of the hard outer case 120, the spring volume 32 is larger than the spring volume 132. As a result, a larger percentage of the internal volume 125 of the hard outer case 120 is occupied by the electrode stack 140 as compared to the hard outer case 20 and electrode stack 140. Therefore, the prismatic battery cell 110 includes a higher energy density as compared to the prismatic battery cell 10. Comparing a size of the planar surface 45 of each of the electrode pair layers 42 to the size of each of the planar surfaces 45 of the electrode pair layers 142, the planar surfaces 45 of the electrode pair layers 42 are relatively larger and respectively have a greater surface area than the planar surfaces 145 of the electrode pair layers 142. As a result, the electrode stack 140 includes more electrode pair layers 142 stacked on top of each other as compared to the number of electrode pair layers 42 of the electrode stack 40. As a result, when the anode electrode of the electrode stack 140 expands in volume as a result of lithiation, the side surface 148 moves a greater distance than the side surface 48 of the electrode stack 40. The greater distance of movement of the side surface 148 of the electrode stack 140 as compared to the side surface 48 of the electrode stack 40 may result in greater wear and a reduced lifespan of the prismatic battery cell 110 as compared to the prismatic battery cell 10.

One may select between the prismatic battery cell 10 of FIG. 1 and the prismatic battery cell 110 of FIG. 4 based upon prioritization of energy density and battery lifespan. In one embodiment, a hybrid between the prismatic battery cell 10 and the prismatic battery cell 110 may be selected, including a cubic or near cubic polyhedron hard outer case. Such a near cubic polyhedron configuration balances electrode stack expansion distance with spring volume and provides a prismatic battery cell with balanced performance. Testing has additionally shown that a near cubic polyhedron battery cell configuration may include optimized volume utilization resulting in maximized cell energy density and maximized cell specific energy.

Figure 7:
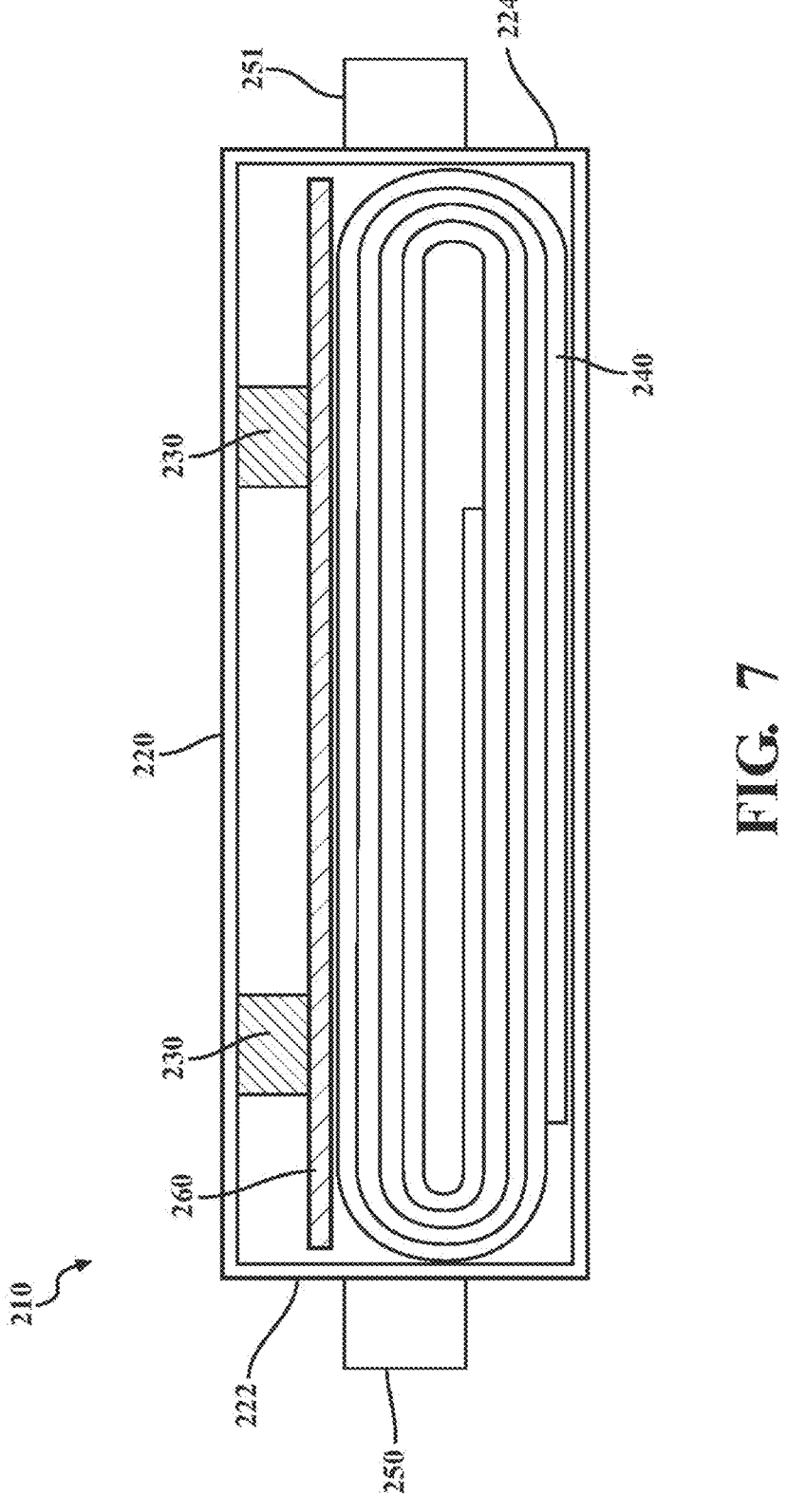
FIG. 7 schematically illustrates in side cross-sectional view an additional exemplary alternative prismatic battery cell, including a jellyroll electrode stack, in accordance with the present disclosure.

FIG. 7 schematically illustrates in side cross-sectional view an additional exemplary alternative prismatic battery cell 210, including a jellyroll electrode stack 240. The prismatic battery cell 210 is illustrated including a plurality of built-in springs 230 pressing against the jellyroll electrode stack 240. The prismatic battery cell 210 is further illustrated including a hard outer case 220, a first tab 250 disposed upon a first side surface 222 of the hard outer case 220, and a second tab 251 disposed upon a second side surface 224 of the hard outer case 220. The prismatic battery cell 210 operates similarly to the prismatic battery cell 10 of FIG. 1 and the prismatic battery cell 110 of FIG. 4.

Figure 8:
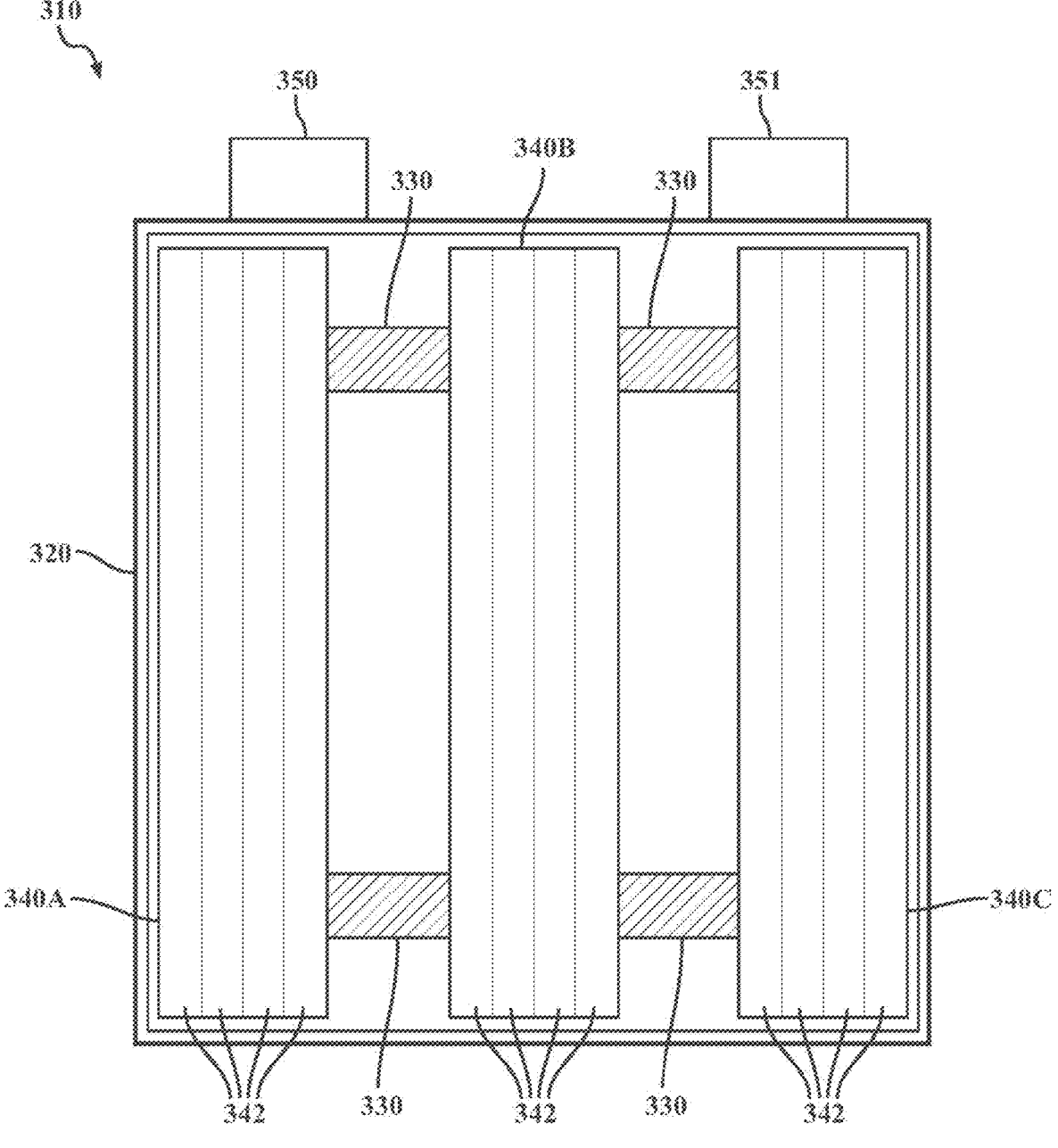
FIG. 8 schematically illustrates in side cross-sectional view an additional exemplary alternative prismatic battery cell, including three electrode stacks, with built-in springs disposed between the electrode stacks, in accordance with the present disclosure.

FIG. 8 schematically illustrates in side cross-sectional view an additional exemplary alternative prismatic battery cell 310, including electrode stacks 340A, 340B, 340C, with built-in springs 330 disposed between the electrode stacks 340A, 340B, 340C. The prismatic battery cell 310 is illustrated including a hard outer case 320, a first tab 350, and a second tab 351. The prismatic battery cell 310 is exemplary, and prismatic battery cells with two electrode stacks with built-in springs disposed therebetween or prismatic battery cells with four or more electrode stacks with built-in springs disposed therebetween are envisioned.

The side surface 148 of the electrode stack 140 of the prismatic battery cell 110 of FIGS. 4 and 5 moves a relatively long distance as a result of the volumetric expansion of the entire electrode stack 140. Returning to FIG. 8, by disposing built-in springs 330 between the electrode stacks 340A, 340B, 340C, as the electrode stacks 340A, 340B, 340C expand due to lithiation, the electrode stacks 340A, 340B, 340C expand locally, with none of the electrode stacks 340A, 340B, 340C moving long distances as compared to the side surface 148 of the electrode stack 140 of the prismatic battery cell 110 of FIGS. 4 and 5. The electrode stacks 340A, 340B, 340C of FIG. 8 each include a plurality of flat pairs of electrodes 342 stacked upon each other.

Figure 9:
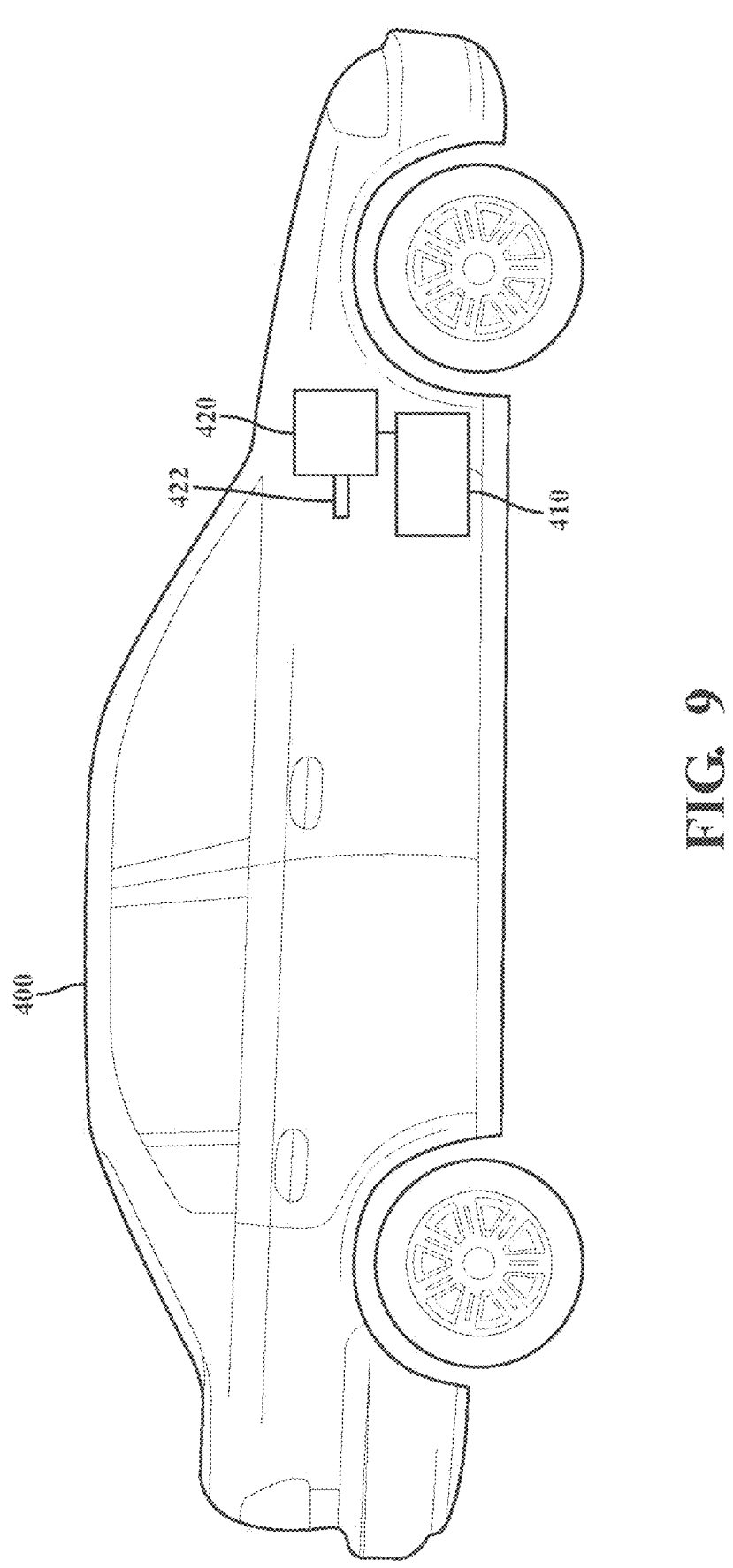
FIG. 9 schematically illustrates a device embodied as a vehicle including an energy storage device including at least one of the prismatic battery cells of FIG. 1, in accordance with the present disclosure.

FIG. 9 schematically illustrates a device 400 embodied as a vehicle including an energy storage device 410 including at least one of the prismatic battery cells 10 of FIG. 1. The device 400 is exemplary and may alternatively be embodied as an energy generation unit or powertrain, a boat, an airplane, a locomotive, or other similar device. The energy storage device 410 provides electrical energy to the device 400 including an electric machine 420 which may include an output component 422 configured to provide an output torque that may be useful to propel the device 400. In one embodiment, a system may be described including the device 400 and the apparatus described herein including a prismatic battery cell 10 of FIG. 1 including an electrode stack 40 and a built-in spring 30 configured for pressing against the electrode stack 40.

The built-in springs 30 within the prismatic battery cell 10 of FIG. 1, providing a function of internal pressure control, make the prismatic battery cell 10 a standalone cell. Such a standalone cell may operate without pressure control units disposed outside of the prismatic battery cell 10 of the energy storage device 410 in FIG. 9. Such a standalone cell may increase energy density in the battery cell 10 and the energy storage device 410 and may mitigate risks of battery cell and energy storage device deformation. In some embodiments, the disclosed prismatic battery cell 10 of FIG. 1 may be used with pressure control units disposed outside of the prismatic battery cell 10, with the disclosed built-in springs 30 managing a portion of the volumetric expansion of the electrode stack, and with the external pressure control units managing a pressure increase resulting from a second portion of the volumetric expansion.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus for prismatic battery cell, the apparatus comprising:
    a hard outer case defining an internal volume;
    an electrode stack disposed within the internal volume and including a pair of an anode electrode and a cathode electrode and including a plurality of electrode pair layers stacked parallel to each other, wherein the electrode pair layers each include a planar surface, wherein the anode electrode is a high-expansion anode electrode and expands in volume by at least 50% between a fully delithiated state to a fully lithiated state; and
    a built-in spring configured for pressing against the electrode stack in a direction perpendicular to the planar surface of each of the electrode pair layers;
    wherein the plurality of electrode pair layers stacked parallel to each other include a first plurality of electrode pair layers stacked parallel to each other, a second plurality of electrode pair layers stacked parallel to each other, and a third plurality of electrode pair layers stacked parallel to each other with the built-in spring including a first plurality of built-in springs located between the first plurality of electrode pair layers stacked parallel to each other and the second plurality of electrode pair layers stacked parallel to each other and a second plurality of built-in springs located between the second plurality of electrode pair layers stacked parallel to each other and the third plurality of electrode pair layers stacked parallel to each other.

2. The apparatus of claim 1, further comprising a hard plastic supporting plate disposed between the built-in spring and the electrode stack, wherein the hard plastic supporting plate is configured for evenly distributing force upon the electrode stack.

3. The apparatus of claim 2, wherein the hard plastic supporting plate is affixed to the built-in spring and is configured for maintaining a location and an orientation of the built-in spring within the prismatic battery cell.

4. The apparatus of claim 1, wherein the electrode stack includes a stack of flat pairs of the anode electrodes and the cathode electrodes.

5. The apparatus of claim 1, wherein the anode electrode includes lithium metal.

6. The apparatus of claim 1, wherein the anode electrode is a high-silicon content anode electrode, wherein silicon is present in the anode electrode in a range from 5 parts by weight to 100 parts by weight per 100 parts by weight of the anode electrode.

7. The apparatus of claim 1, wherein the built-in spring is configured for maintaining at least a minimum electrode pressure upon the electrode stack when the anode electrode is in a fully delithiated state.

8. The apparatus of claim 1, wherein the built-in spring is configured for not exceeding a maximum electrode pressure upon the electrode stack when the anode electrode is in a fully lithiated state.

9. The apparatus of claim 1, wherein the hard outer case is a rectangular polyhedron including a relatively long edge and a relatively short edge which is shorter than the relatively long edge.

10. The apparatus of claim 9, wherein the planar surface of each of the electrode pair layers is perpendicular to the relatively short edge.

11. The apparatus of claim 9, wherein the planar surface of each of the electrode pair layers is perpendicular to the relatively long edge.

12. The apparatus of claim 1, wherein the hard outer case is a rectangular polyhedron having a first side and a second side; and
    further comprising:
    a first tab including a first battery terminal disposed on the first side; and
    a second tab including a second battery terminal disposed on the second side.

13. A system comprising:

a device including a prismatic battery cell including:

a hard outer case defining an internal volume;

an electrode stack disposed within the internal volume and including a pair of an anode electrode and a cathode electrode and including a plurality of electrode pair layers stacked parallel to each other, wherein the electrode pair layers each include a planar surface, wherein the anode electrode is a high-expansion anode electrode and expands in volume by at least 50% between a fully delithiated state to a fully lithiated state; and a plurality of built-in springs configured for pressing against the electrode stack in a direction perpendicular to the planar surface of each of the electrode pair layers;

wherein the plurality of electrode pair layers stacked parallel to each other include a first plurality of electrode pair layers stacked parallel to each other, a second plurality of electrode pair layers stacked parallel to each other, and a third plurality of electrode pair layers stacked parallel to each other with the plurality of built-in spring including a first plurality of built-in springs located between the first plurality of electrode pair layers stacked parallel to each other and the second plurality of electrode pair layers stacked parallel to each other and a second plurality of built-in springs located between the second plurality of electrode pair layers stacked parallel to each other and the third plurality of electrode pair layers stacked parallel to each other.

14. The system of claim 13, wherein the device is a vehicle.

15. The system of claim 13, wherein the anode electrode includes lithium metal.

16. The system of claim 13, wherein the anode electrode is a high-silicon content anode electrode, wherein silicon is present in the anode electrode in a range from 5 parts by weight to 100 parts by weight per 100 parts by weight of the anode electrode.

17. The system of claim 13, wherein the built-in spring is configured for maintaining at least a minimum electrode pressure upon the electrode stack when the anode electrode is in a fully delithiated state.

18. The system of claim 13, wherein the built-in spring is configured for not exceeding a maximum electrode pressure upon the electrode stack when the anode electrode is in a fully lithiated state.

19. The system of claim 13, wherein the hard outer case is a rectangular polyhedron including a relatively long edge and a relatively short edge which is shorter than the relatively long edge.

20. The system of claim 19, wherein the planar surface of each of the electrode pair layers is perpendicular to the relatively short edge.

* * * * *